US008266225B2

(12) United States Patent
Gross et al.

(10) Patent No.: US 8,266,225 B2
(45) Date of Patent: Sep. 11, 2012

(54) PROGRAM-SENSITIVE LINK IN CONTENT

(75) Inventors: Yuval Gross, Kirkland, WA (US); Keith A. Fournier, II, Snoqualmie, WA (US); Tatjana B. Fournier, Snoqualmie, WA (US); Carmen Zlateff, Kirkland, WA (US); Adam Christopher Czeisler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 12/144,716

(22) Filed: Jun. 24, 2008

(65) Prior Publication Data
US 2009/0319620 A1 Dec. 24, 2009

(51) Int. Cl.
*G06F 15/16* (2006.01)
*G06K 9/36* (2006.01)
(52) U.S. Cl. .................. 709/206; 709/217; 709/218
(58) Field of Classification Search .................. 709/206, 709/217, 218; 382/232; 345/689, 699
See application file for complete search history.

(56) References Cited

U.S. PATENT DOCUMENTS

| | | | |
|---|---|---|---|
| 6,629,134 B2 | 9/2003 | Hayward et al. | |
| 6,948,135 B1 | 9/2005 | Ruthfield et al. | |
| 6,980,993 B2 | 12/2005 | Horvitz et al. | |
| 6,983,317 B1 | 1/2006 | Bishop et al. | |
| 7,016,944 B1 | 3/2006 | Meyer et al. | |
| 7,065,746 B2 | 6/2006 | Szabo et al. | |
| 7,089,286 B1* | 8/2006 | Malik ........................... | 709/206 |
| 7,325,032 B2 | 1/2008 | Zuberec et al. | |
| 7,346,848 B1 | 3/2008 | Ruthfield et al. | |
| 7,542,050 B2* | 6/2009 | Kramer et al. ................ | 345/629 |
| 7,672,436 B1* | 3/2010 | Thenthiruperai et al. . | 379/88.04 |
| 2001/0047408 A1* | 11/2001 | Jacobs et al. ................. | 709/224 |
| 2005/0122345 A1* | 6/2005 | Kirn et al. ..................... | 345/629 |
| 2005/0195157 A1* | 9/2005 | Kramer et al. ................ | 345/156 |
| 2006/0218232 A1* | 9/2006 | Kubala et al. ................ | 709/206 |
| 2006/0265458 A1* | 11/2006 | Aldrich et al. ............... | 709/206 |
| 2007/0121819 A1* | 5/2007 | Kirn et al. .................. | 379/88.13 |
| 2009/0056525 A1* | 3/2009 | Oppenheimer ............... | 84/609 |

OTHER PUBLICATIONS

Dieterich, et al., "State of the Art in Adaptive User Interfaces", in Schneider-Hufschmidt M., Kuehme T., Malinowski U. (eds), Adaptive User Interfaces, Elsevier, 1993, pp. 13-48.
Limbourg, et al., "USIXML: A User Interface Description Language for Context-Sensitive User Interfaces", in ACM AVI 2004 Workshop: UIXML 2004, pp. 55-62, 2004.
Ranganathan, et al., "A Middleware for Context-Aware Agents in Ubiquitous Computing Environments", in: ACM/IFIP/USENIX International Middleware Conference, Rio de Janeiro, Brazil, Jun. 2003, 20 pages. Van De Sompel, et al. "Generalizing the OpenURL Framework beyond References to Scholarly Works", Date: Jul./Aug. 2001, 22 Pages, D-Lib Magazine, vol. 7 No. 7/8 Publisher: Corporation for National Research Initiatives http://www.dlib.org/dlib/july01/vandesompel/07vandesompel.html.

* cited by examiner

*Primary Examiner* — Ashok Patel
*Assistant Examiner* — Linglan Edwards

(57) ABSTRACT

Context-sensitive content may be created that may be recognized by a particular program but ignored by other programs. For example, in an e-mail message or other type of message, content could be created that advises the user to download a particular client for an enhanced content-viewing experience, along with a link pointing to a site where the client may be downloaded. This content and link could be surrounded by tags that would not be recognized by most clients, but that would be recognized by the client that provides the enhanced experience. Thus, most clients would render the advice and link, but the client that provides the enhanced experience could be configured to omit the link when it recognizes the surrounding tags, since a recipient who is viewing the e-mail with that client already has access to the enhanced experience.

20 Claims, 5 Drawing Sheets

PROGRAM-SENSITIVE LINK IN CONTENT

BACKGROUND

Message content is normally sent in a form that can be interpreted and rendered by a variety of different programs. For example, there are many different e-mail programs, all of which can process messages sent in a variety of formats. Most e-mail programs can process e-mail in a simple text format, a Hypertext Markup Language (HTML) format, etc. While programs may have their own individual ways of rendering message content, they generally provide a predictable, and relatively uniform, user experience. For example, most e-mail programs will recognize an HTML hyperlink and will render the text associated with the link underlined and in a colored font, and this style is generally followed regardless of the particular e-mail program being used.

While e-mail programs, and other messaging programs, may provide a predictable user experience with most types of content, there are certain enhancements to the user experience that can be implemented if the messaging program is familiar with the content. For example, the presence of certain text, links, tags, etc., in an e-mail message might signal the program to behave in some way that goes beyond the general functionality expected of an e-mail program. A problem that arises is that, when one sends a message, one normally does not know what program is going to be used to view the message. Thus, if one creates, say, an e-mail message that is designed to take advantage of a particular e-mail program's capabilities, there is a possibility that the recipient is using that particular program to view the message and thus would experience the capabilities provided by that program. On the other hand, if the recipient views the message with a different e-mail program, then the user experience could be provided only through the e-mail program's general capabilities.

SUMMARY

An e-mail client, or other type of messaging program, may be provided that offers enhanced capabilities with respect to certain messages. Thus, for example, an e-mail program could be provided that performs certain non-standard actions with respect to certain messages. An e-mail could be created that signals the program to apply these actions to the message, so that when a message arrives and is viewed with that e-mail program, the user experience would be different from what would be provided by a normal e-mail program. However, since the program that will be used to view the e-mail is unknown at the time the e-mail is created and/or sent, the e-mail may be constructed so that it works "reasonably" with most e-mail programs, while also signaling that—if the message is being read by a specific e-mail program—then that specific program is to apply its enhanced capabilities to the e-mail. One way to construct such an e-mail is to include a tag within the e-mail that is recognized by the program that provides the enhanced capabilities, but that is not recognized by normal e-mail programs. Thus, most e-mail programs will not recognize the tag, and will ignore it. However, the program that provides enhanced capabilities may use the tag as a signal to apply those enhanced capabilities.

One way to use the tag is to surround, with the tag, some content that invites the user to obtain a new e-mail program to experience the enhanced capabilities. Thus, a message such as "For an enhanced experience, download the XYZ Mail client," together with a link to the download site for that client, could be surrounded by a pair of tags. A normal e-mail program, which would not recognize the tags, would simply render the content that is surrounded by the tags, thereby inviting the recipient to download a new mail client. On the other hand, if the same message is being processed by the "XYZ Mail client", then that client could recognize the tags and could omit the message and the link from the rendering of the e-mail (since a user who is viewing the message with the XYZ mail client already has that client, and there is no reason to invite that user to download the client).

In one example, the techniques described herein may be used to implement the e-mailing of photos. For example, an e-mail client could offer its users the option to construct a "photo mail," in which the e-mail could contain thumbnails of the photos (or other low-resolution versions of the photos), and links to obtain higher-resolution versions of the photos. The option to create a photo mail might also include the option to upload the high-resolution versions to a server, where the photos that are being mailed would be stored for some amount of time to allow the recipient of the mail to download the photos. The e-mail client that offers the photo mail option might, for example, be an instance of the e-mail client mentioned above that provides enhanced capabilities. Normally, obtaining the high-resolution versions of the photos would involve clicking the links, one-by-one, and which would cause a browser to be opened to download each photo. However, an e-mail client that is familiar with the format of the message could offer the user the opportunity to download all of the high-resolution photos. The e-mail program could provide the functionality to obtain each photo from its respective link without the recipient having to click all of the links. The tags mentioned above could be used to signal the e-mail program about the presence of such links in the e-mail, or the links could be detected in other ways. Being able to download all of the photos in the way described above is an example of an enhanced capability that an e-mail program could provide. Including, as part of an e-mail message, an indication that such enhanced capabilities are available with a particular e-mail program, may be used as a way to encourage use of that e-mail program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
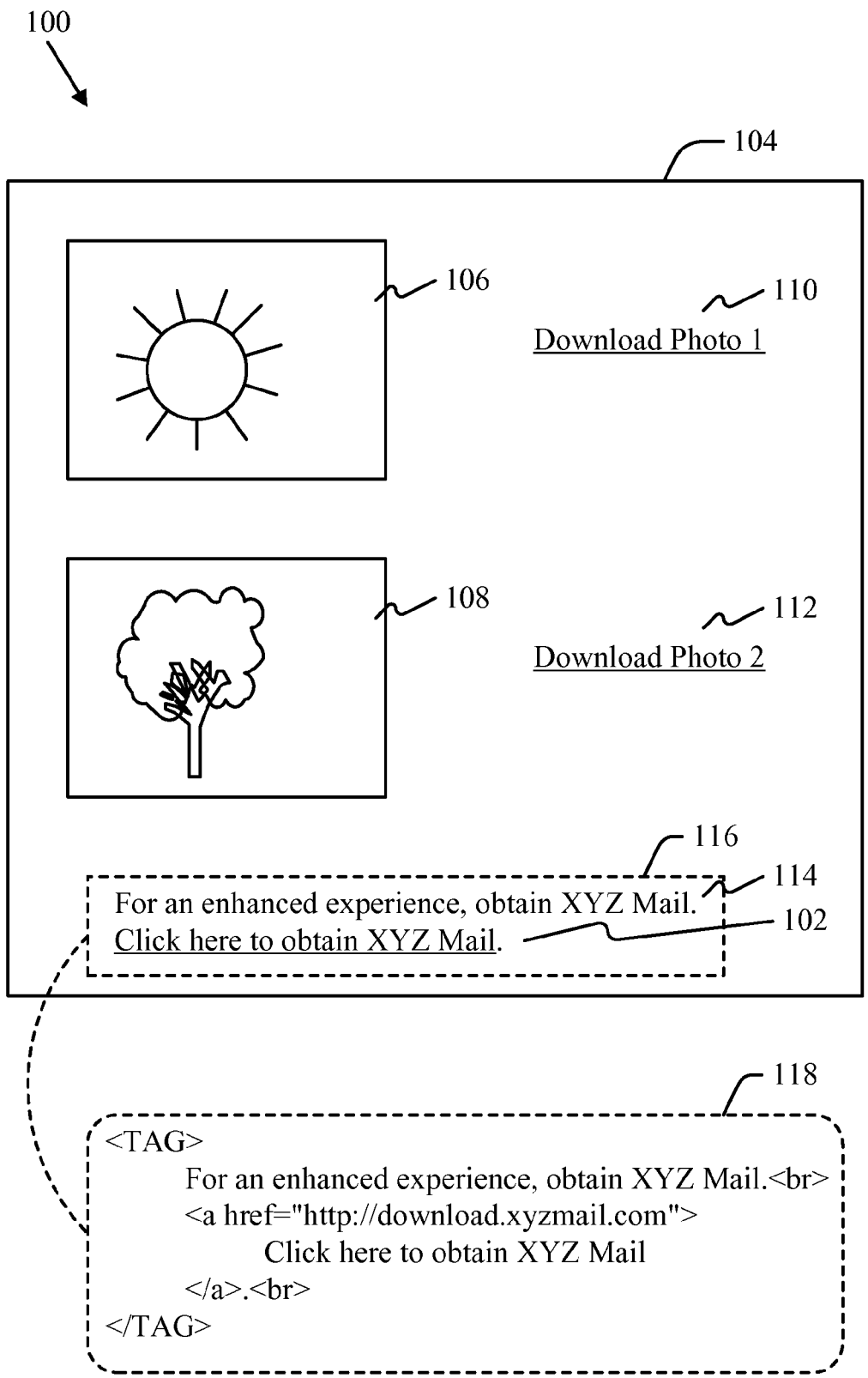
FIG. 1 is a block diagram of an example user interface that contains a link to offer an enhanced experience.

E-mail can be viewed with a variety of different programs. For example, there are numerous desktop e-mail clients, mobile e-mail clients, web mail services, etc., that may be used to read an e-mail. Since most of these programs are able to render the same type of content in similar ways, it is possible to send an e-mail to a recipient without knowing what program will be used to view the e-mail. For example, one may send a recipient an HTML e-mail that contains a link to a web page. While different e-mail programs may each render the link differently, it is generally the case that e-mail software (whether desktop-based, mobile-based, web-based, etc.) will present the link in a form that is selectable by the user, and will point the an appropriate program (e.g., the relevant platform's web browser) to the linked page when the link is clicked.

While different e-mail programs may provide similar, predictable user experiences with respect to the same e-mail content, sometimes there is reason to provide an enhanced user experience with respect to certain e-mails. For example, an e-mail client might allow its users to create a "photo mail", in which photos are sent by including thumbnails of the photos (or other low-resolution versions of the photos) in the e-mail, along with links to download higher-resolution versions of the photos. (As part of creating the photo mail, the photos could be uploaded to a server where they could be temporarily stored so that the recipient of the mail could download the photos.) As another example, an on-line service, such as a photo-sharing or photo-organizing web site, may allow its user to create such an e-mail from the web site. If plural photos are sent, then the photos may be downloaded by clicking each link, which causes a browser to be invoked and/or pointed to the Uniform Resource Locator (URL) specified in each link. Thus, while it is possible to use the normal functionality of an e-mail program to download the photos, separately opening each link and downloading each photo through a browser may be tedious. An e-mail program that can download all of the linked photos without the user having to click each link would reduce the tedium of downloading all of the photos in the e-mail, and thus would enhance the user experience. However, in order to provide this enhanced experience, the e-mail program would have to recognize the nature of the e-mail in order to treat the e-mail differently from a normal e-mail.

An e-mail program could be created with the functionality to recognize such an e-mail, and to provide the enhanced functionality of downloading all of the linked photos in the e-mail without the user having to click each link separately. However, a recipient might receive such an e-mail and not know that a program with this type of functionality is available. The e-mail could be constructed to advise the recipient that such a program exists and that such a program could enhance the experience relating to the e-mail. The e-mail could also advise where to get the program. However, there may be reason for the e-mail to display, or not to display, this advice depending on whether the recipient already has the program with enhanced capabilities. For example, if the user is reading e-mail with a program that does not provide this enhanced capability, then the e-mail could display a message advising the user that such a program exists, and where to download it. On the other hand, if the user is reading the e-mail with the program that provides the enhanced capability, then the recipient already has the program, so the advice about obtaining the program can be omitted. The subject matter herein provides mechanisms by which an e-mail (or other type of message) could be constructed so as to advise a recipient about the availability of a program that provides enhanced functionality, when the recipient does not already have that program. In one example, the program that allows users to create a "photo mail" (as mentioned above), is the same program that provides the enhanced capabilities when receiving such a photo mail; thus, that program may be the one that inserts the message and download link into the e-mail.

The description herein may, at times, refer to e-mail messages. However, the techniques described herein may be used with other types of messages, such as Instant Messages (IMs), messages sent via Short Message Service (SMS), etc., or other types of content, such as web pages. Moreover, the description here may also refer to the enhanced functionality of downloading a set of photos to which links are contained in an e-mail, but various other types of enhanced functionality could be provided (as described below).

Turning now to the drawings, FIG. 1 shows an example of a user interface 100 that contains a link 102 to download a program that offers an enhanced experience. In the example of FIG. 1, user interface 100 displays an e-mail message 104, as it might be displayed by an e-mail program. The e-mail program could be an e-mail client installed on a user's machine, such as a desktop, laptop, or handheld computer. The e-mail program could also be a web-mail application that a user accesses through a web browser. In general, the e-mail program that displays user interface 100 could be any appropriate type of program.

The e-mail message 104 displayed in example user interface 100 comprises photos. Thus, e-mail message 104 contains images, such as images 106 and 108. Images 106 and 108 may, for example, be "thumbnails" or other types of low-resolution versions of the photos that are being mailed to a user. The low-resolution images may be displayed next to (or otherwise in association with) links to obtain versions of the photos at resolution(s) that are higher than the low-resolution version. Thus, images 106 and 108 are displayed in association with links 110 and 112, respectively. Link 110, when activated, allows a user to download the high-resolution version of the photo represented by low-resolution image 106, and link 112, when activated, allows a user to download the high-resolution version of the photo represented by image 108. Links 110 and 112 are displayed in the form of a textual description (e.g., "Download Photo 1"), although the link typically refers to a particular URL that may or may not be shown as part of user interface 100.

The mechanism for downloading high-resolution photos that is shown in example user interface 100 is what might be viewed as a "default" experience. Thus, user interface 100 is what a user might see when using a general purpose mail client that has no particular knowledge of the content in the e-mail. A different e-mail client might be able to provide an enhanced user experience. For example, in a normal e-mail program, in order to download high-resolution photos in the default experience, a user might have to click on links 110 and 112 separately, thereby opening a web browser and downloading each photo separately. User interface 100 shows an e-mail message 104 with two example links which would involve downloading two separate photos. However, if an e-mail contained many photos (e.g., ten photos), then downloading the high-resolution versions of all of the photos would involve ten separate actions, in which one would click ten separate links and go through a browser's "save file" procedure ten times. However, a different e-mail client might offer the option to save all of the high-resolution versions of the photos, and to do so in one action. An e-mail client could offer this option if it can recognize the e-mail, and if it has the appropriate logic to handle the content in the e-mail in a certain way. For example, an e-mail client could contain the logic that recognizes the e-mail as containing links to high-resolution images, and could also contain logic to obtain the images referenced by all of the links in the e-mail.

Being able to provide this enhanced functionality involves being able to recognize the e-mail message. The e-mail may be created by a photo-sharing site, and the operator of the photo sharing site may also be the distributor of the e-mail client that offers the enhanced experience. Thus, the e-mail can be created with a tag that may be recognized by the e-mail client as a signal to provide the enhanced experience. Moreover, the tag may be chosen so as to support a reasonable default experience by those e-mail programs that do not recognize the tag. An example of such a tag is shown in FIG. 1.

In this example, user interface 100 displays a message 114, which states "For an enhanced experience, obtain XYZ mail." Thus, "XYZ mail" might be a mail client that is able to offer an enhanced experience, such as the experience described above in which all photos referred to in links contained in the e-mail are downloaded. As noted above, user interface 100 may display a link 102 that offers a user the chance to obtain the enhanced experience, which, in this example, is displayed with the message "Click here to obtain XYZ mail." (In FIG. 1, for the purpose of illustration, message 114 and link 102 are collectively referred to as content 116.) E-mail message 104 is typically in the form of Hypertext Markup Language (HTML), or some other structured format, and thus can have tags, code, or other instructions embedded within its content. In this example, the code 118 that causes content 116 to be displayed surrounds the content with tags, which can be recognized by the e-mail client that provides an enhanced experience. However, because of the way that engines that interpret HTML or other structured formats work, this tag could be ignored by other mail programs that do not recognize the tag. In FIG. 1, the surrounding tag is named "TAG", although the tag could have any name or any form.

Thus, code 118 may contain the HTML code that displays message 114 and link 102. As shown, the code for link 102 may contain both the text that is shown in user interface 100 ("Click here to obtain XYZ mail") as well as a reference to a URL that could be used to obtain the XYZ mail program (the quoted material following the word "href"). Since user interface 100, in the example of FIG. 1, is generated by an e-mail program that does not recognize the tag that surrounds code 118, that e-mail program generates a default experience, which involves showing message 114 and link 102. Had the e-mail message, containing code 118, been processed by the e-mail client that was able to provide the enhanced experience (e.g., the "XYZ mail" application, that the user was offered the chance to download), that client might have recognized the tag "TAG" in the e-mail, and might have used the tag as a signal to ignore the code embedded within the tag. Thus, e-mail message 104, if displayed on a client offering an enhanced experience, might be displayed without content 116. Moreover, the client that offers the enhanced experience might have logic that uses a tag in code 118 as a signal to provide the enhanced experience. For example, if a client that provides the enhanced experience mentioned above encounters the tag named "TAG" in e-mail message 104, it might take that as a signal that the e-mail contains links to download photos from a particular photo-sharing web site, and might then analyze the e-mail to collect the links and then offer the user the chance to download all of the photos in the e-mail.

Tags are merely one way to implement the functionality described above, and other appropriate mechanisms could be used to achieve this functionality.

Figure 2:
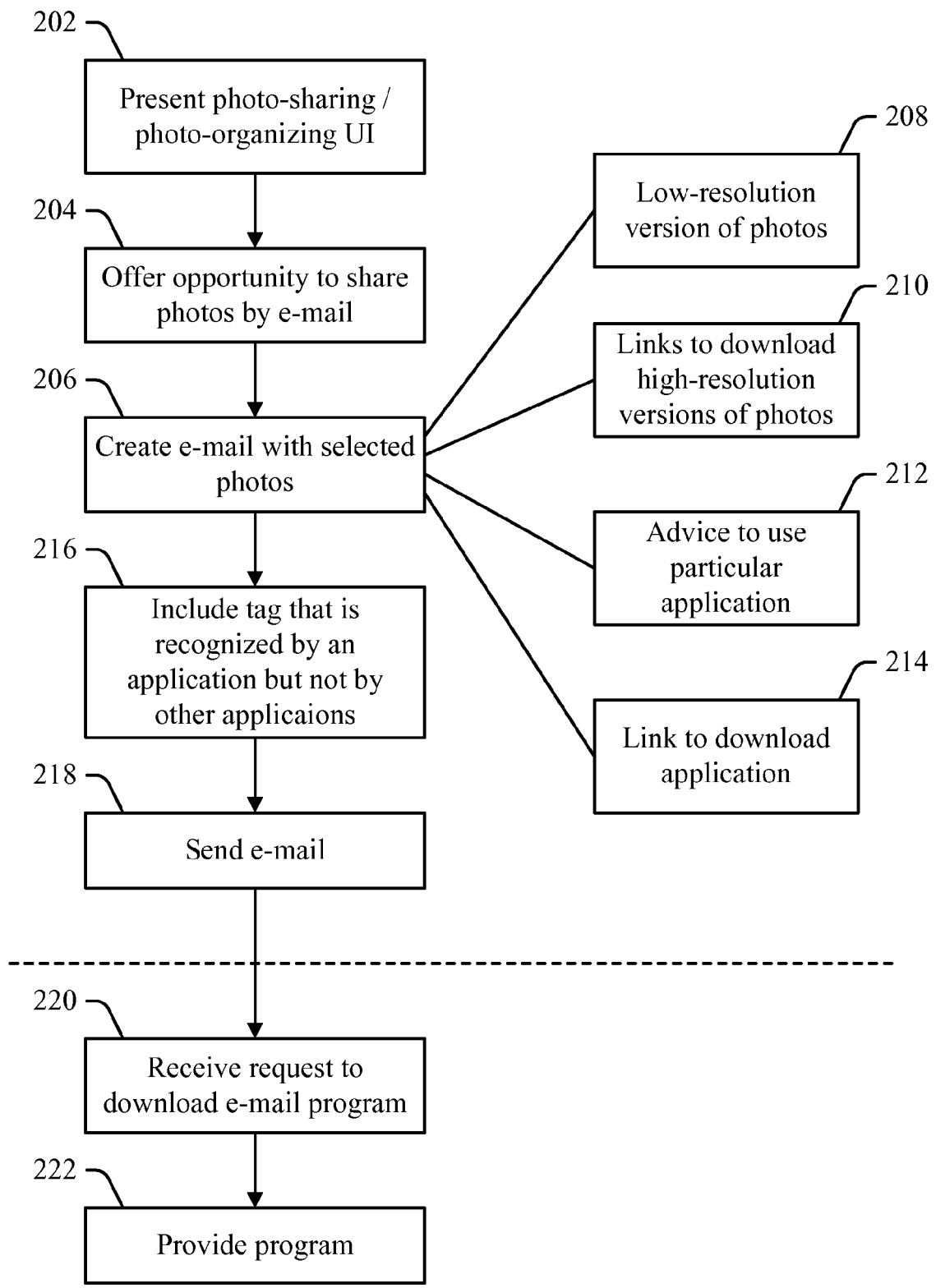
FIG. 2 is a flow diagram of an example process in which an e-mail may be created that advises its recipient of the enhanced functionality available with a particular program, and in which a request to download such a program may be received.

FIG. 2 shows an example in which an e-mail may be created that advises its recipient of the enhanced functionality available with a particular program, and in which a request to download such a program may be received. For example, an e-mail program could perform part of the process of FIG. 2 by creating a photo mail (as described above), and the manufacturer and/or distributor of that e-mail program could then perform other portions of the process of FIG. 2 by receiving a request (from the recipient of the mail) to download that e-mail program. However, it will be understood that the stages shown in FIG. 2 could be performed by any one or more entities in any context. Moreover, it will be understood that the reference to photo e-mails is merely an example, since any type of content could be created, and any type of program could be used to view or process such content. Thus, the subject matter herein is not limited to the case where the content is an e-mail, and is not limited to the case where the content contains photos. The process of FIG. 2 may be used in any context.

Moreover, before turning to a description of the stages of FIG. 2, it will be understood that the flow diagram of FIG. 2—as well as the flow diagrams in FIGS. 3 and 4, which are discussed below—show examples in which stages of a process are performed in a particular order, as indicated by the lines connecting the blocks. However, these stages could be performed in any order, or in any combination or sub-combination.

Turning now to the description of the stages of FIG. 2, at 202 a user interface (UI) for photo-sharing may be presented to a user. At 204, the UI may offer the user the opportunity to share photos by e-mail. For example, the UI may allow the user to send, via e-mail, photos that the user has stored on his or her machine. At 206, an e-mail with the selected photos may be created. The e-mail may include various elements. Some example elements that may be included are: a low-resolution version of the selected photos (block 208); links to download high-resolution versions of the photos (block 210); advice to use a particular application to view the e-mail (block 212); and/or a link to download the application specified in that advice (block 214). As part of creating the e-mail, high-resolution versions of the photos could be uploaded to a server so that the e-mail can contain links to the server's copy of those high-resolution versions. When these elements are included in the e-mail, the e-mail may, when viewed on an appropriate e-mail program, have the appearance of user interface 100 (shown in FIG. 1). While the foregoing are examples of some elements that could be included in an e-mail, any additional and/or alternative elements could be included.

At 216, a tag may be included in the e-mail, in order to facilitate either the enhanced experience or default experience, depending on which application is being used to view the e-mail. The tag, and the format in which it is to be included in the e-mail, may be chosen in such a way so as to be ignored by most e-mail program. For example, most programs that process HTML (e-mail programs, browsers, etc.) ignore tags that they do not recognize, so a tag that could be chosen that is not part of normal HTML. In one example, code 118 (shown in FIG. 1) could be used, which uses tags to surround content that (a) advises a user about the enhanced functionality available with a particular e-mail program, and (b) provides a link to download that program. The tag chosen in the example of FIG. 1 would not be recognized by a normal HTML engine. However, the tag, as discussed above, could be recognized by the e-mail program that provides an enhanced experience. At 218, the e-mail is sent.

Optionally, some time may pass, as indicated by the dotted horizontal line in FIG. 2. During this time, the recipient to whom the e-mail was sent may have received and opened the e-mail. If that recipient is reading the e-mail on a normal e-mail program (a program other than the one that provides the enhanced experience with that type of e-mail), then the recipient may have viewed the advice to download a new e-mail program in order to receive the enhanced experience. The recipient may choose not to download the program, and simply to accept the default experience. However, the recipient might, alternatively, choose to download the program, in which case a request to download such a program is received at 220. The request may be received by, or on behalf of, the entity that manufactures and/or distributes the enhanced-functionality e-mail client. Or, in the example where the e-mail is created by a particular web site, the request may be received by, or on behalf of, the operator of that web site.

At 222, a program (e.g., an e-mail program) may be provided in response to the request that was received at 220.

Figure 3:
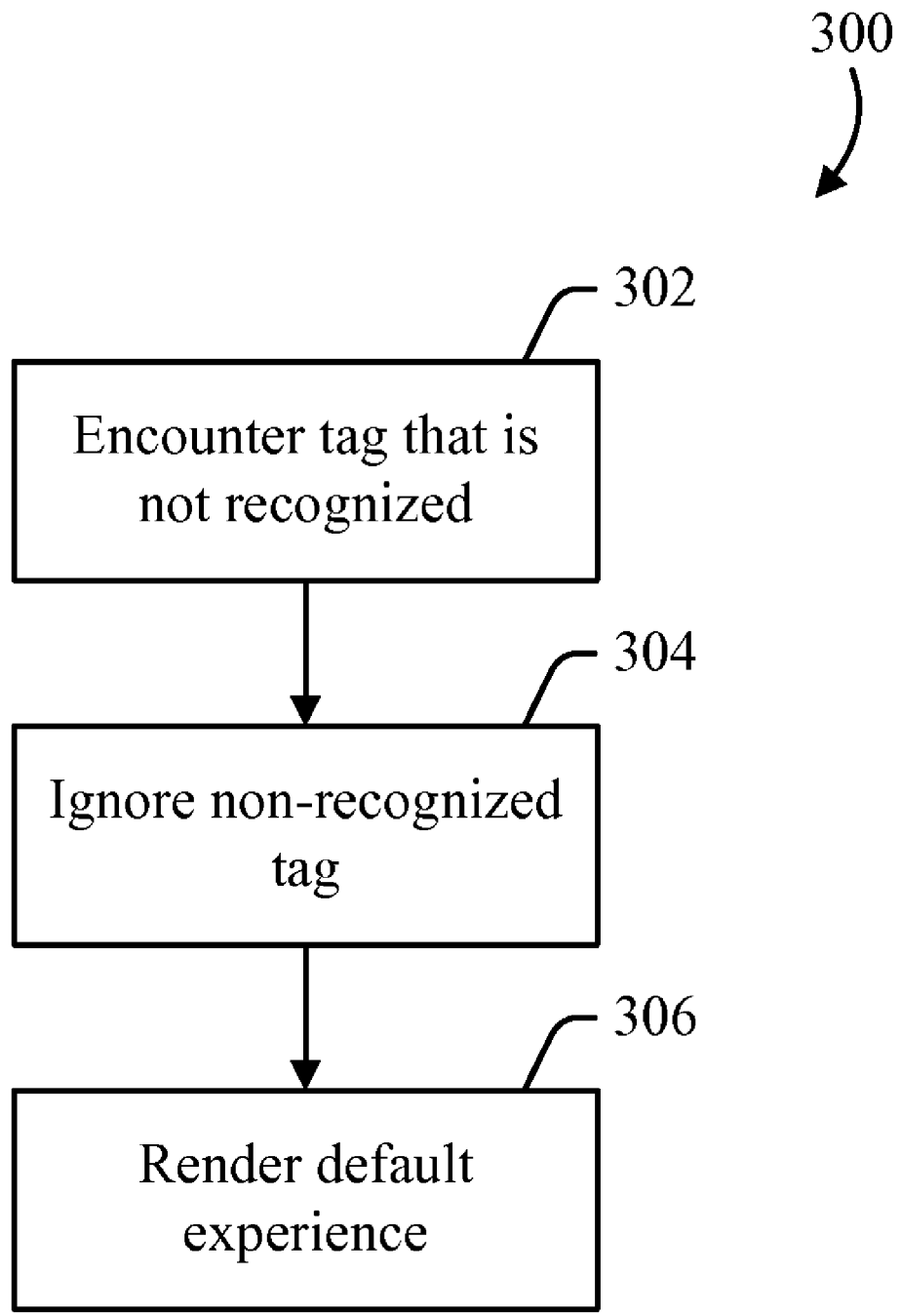
FIG. 3 shows an example process in which an application, which is not enabled to provide an enhanced experience, processes a tag.

FIG. 3 shows an example process 300, in which an application that is not enabled to provide an enhanced experience processes the tag that may have been inserted in an e-mail. For example, process 300 may be performed by an e-mail program that is not familiar with the tag, and that is not configured to provide an enhanced experience (such as the experience of downloading high-resolution photos to which links are contained in the e-mail).

At 302, the program encounters a tag that it does not recognize, such as the tag named "TAG" in code 118 (shown in FIG. 1). At 304, the non-recognized tag is ignored by the program. Whatever material is surrounded by the tag (or tags) may be rendered as if the tag (or tags) did not exist. Thus, at 306, the program renders the default experience. For example, content 116 (shown in FIG. 1) could be rendered as part of an e-mail message, even though a program that provides an enhanced experience might have recognized the tag and might have avoided showing this content.

Figure 4:
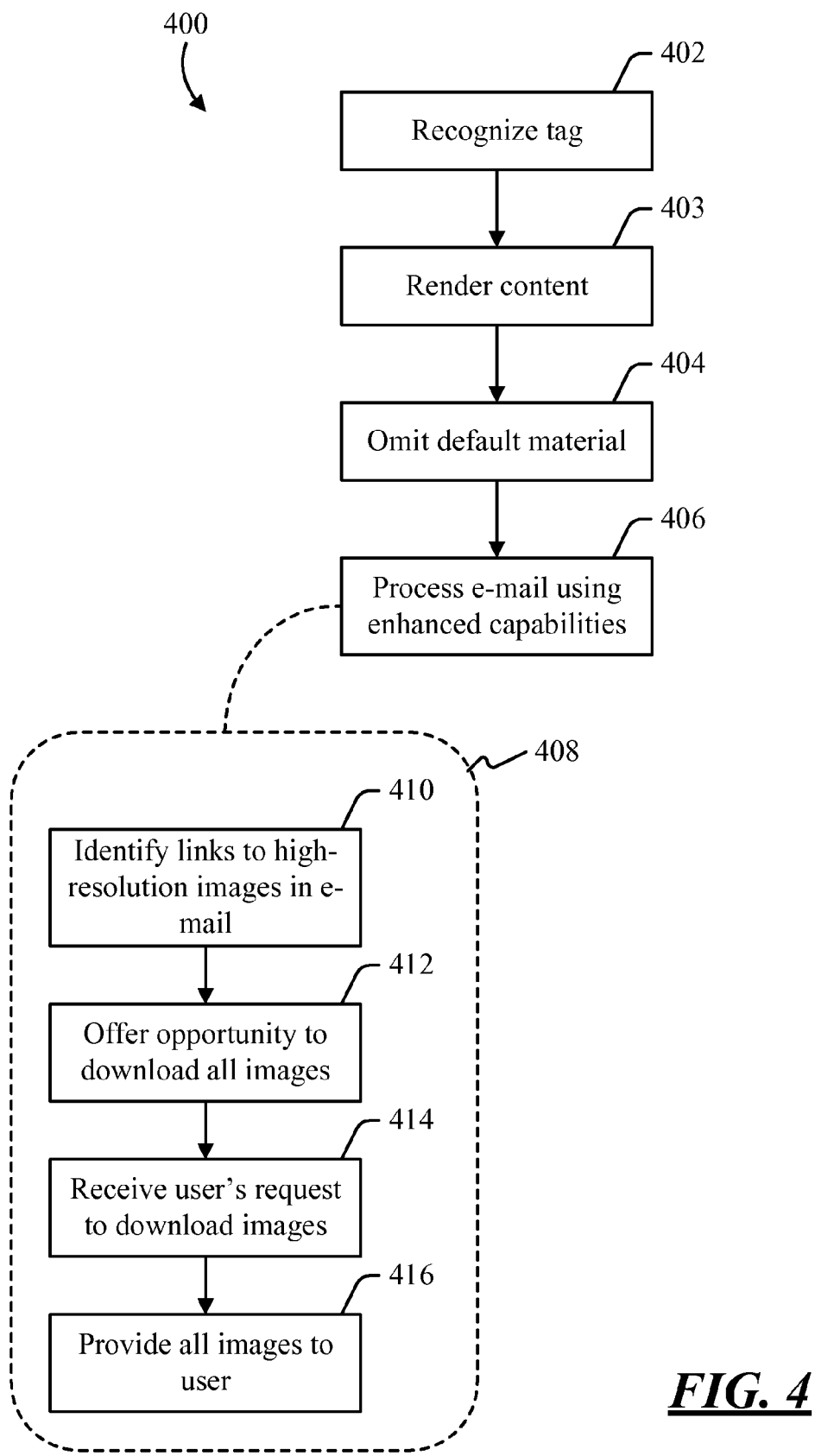
FIG. 4 is a flow diagram of an example process that may be performed by a program that is able to provide an enhanced experience.

FIG. 4 shows an example process 400 that may be performed by an application that is able to provide an enhanced experience, such as the downloading of plural photos from an e-mail as discussed above. For example, process 400 could be performed by the "XYZ Mail" e-mail program (referred to in FIG. 1), that one might download after being advised of the enhanced experience available. However, process 400 could be performed by any program or other component.

At 402, a tag contained in the e-mail is recognized. At 403, the content in the e-mail is rendered, and, at 404, default material identified by the tag is omitted from the rendered content. For example, the tag (or tags) may surround the advice to download a program for an enhanced experience and/or a link to download that program, as described above in connection with FIG. 1. The program could avoid rendering the material surrounded by the tag. At 406, the e-mail is processed using enhanced capabilities. Examples of what could be done using the enhanced capabilities are shown within the dotted enclosure 408.

At 410, the program that performs process 400 could identify links to high-resolution images in the e-mail. As discussed above in connection with FIG. 1, an e-mail may be constructed that contains low-resolution versions of photos, together with links to obtain the high-resolution images. At 410, these links could be identified.

At 412, an opportunity to be offered (e.g., to the recipient of the e-mail) to download all of the high-resolution images referenced in the e-mail. For example, the program could render a dialog box that asks the user if he or she wants to obtain all of the high-resolution images in the e-mail.

If the recipient decides to download the high-resolution versions of the photos, then the recipient's request to do so may be received (at 414). In response to this request, all of the high-resolution images may be provided to the user (at 416).

The program that performs process 400 may recognize the links to the high-resolution images, so that it may collect all of these links and perform the actions of obtaining all of the high-resolution images referenced in these links.

In the foregoing discussion, the notion of downloading several photos that are linked in a single e-mail is discussed as an example of an enhanced functionality that a program could provide. However, various other types of enhanced functionalities could be provided. For example, an e-mail could contain a link to a map on a map web site. An e-mail program could be configured to recognize the e-mail as containing a link to a map, and thus could retrieve the map and display the map as part of the e-mail (rather than the recipient's having to click the link to the map and download the map separately through a browser). Handling a map in this way is an example of an enhanced functionality, and such functionality could be provided through the mechanisms described herein. As yet another example, a web site could store a person's contact information. An e-mail might contain a link to the contact information on the web site, but an e-mail program that recognizes the link could download contact information from the web site could include some of the downloaded contact information in the display of the e-mail—even as to an item of information that was not embedded within the e-mail message itself. Such interaction between the e-mail program and the links or other content contained in the e-mail may be facilitated if the e-mail program is distributed by the same entity that operates the site that adds the links to the e-mail (or the site to which the links refer), or if these entities are in a business relationship with each other in which they have agreed to the meaning of certain content contained in an e-mail.

Figure 5:
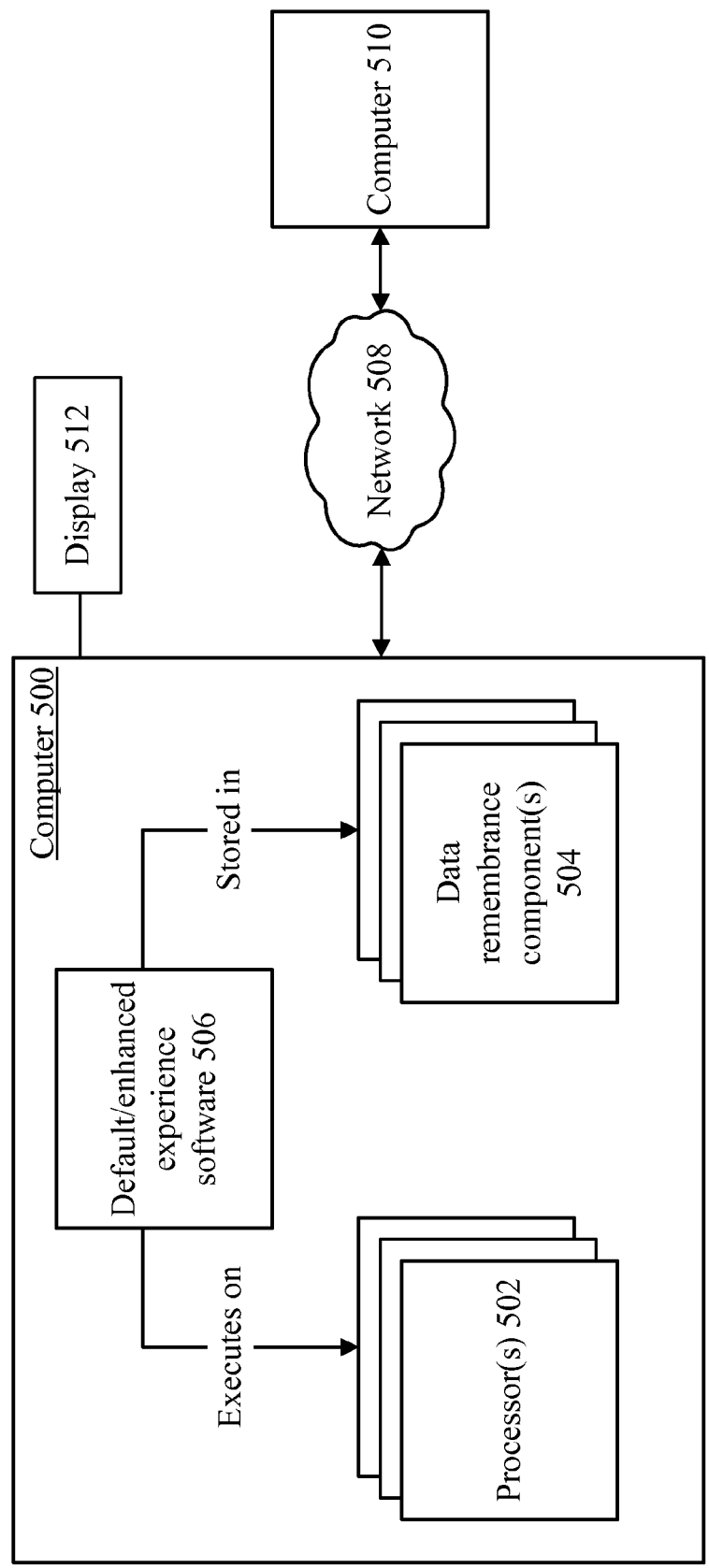
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is default/enhanced experience software 506, which may implement some or all of the functionality described above in connection with FIGS. 1-4, although any type of software could be used. (The subject matter herein may refer to a "message-experience component," which may comprise, or be implemented with the aid of, software 506.) Software 506 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of providing an e-mail message that is handled differently by different programs, the method comprising:
creating an e-mail message for display by a first program on a machine of a recipient of said e-mail message, said e-mail message comprising a first link to an image that, when activated by said recipient of said e-mail message, causes a second program on said machine to be invoked to retrieve said image from said first link and to display said image, said e-mail message further comprising content that advises said recipient of an enhanced experience of viewing said e-mail message that is available with a third program,
including, in said e-mail message, a first tar and a second tag that surround said content, said first tag and said second tag not being recognized by said first program, said first tar and said second tar being recognized by said third program as a signal for said third program to analyze said e-mail for links, to collect said links in said e-mail message, and to display, to said recipient, a dialog box that offers said recipient a chance to download images pointed to by the links in one action without the user having to activate the links separately, said links including said first link, said enhanced experience comprising analysis of said e-mail for links, collecting said links, and displaying said dialog box; and
sending said e-mail message to said recipient.

2. The method of claim 1, wherein said creating comprises:
including, in said e-mail message, a plurality of photos at a first resolution;
including, in said e-mail message, a plurality of links to versions of said photos at one or more second resolutions that are higher than said first resolution, said first link being one of said plurality of links,
wherein said enhanced experience provided by said third program comprises obtaining said versions of said photos referenced by said plurality of links without said recipient having to activate said links.

3. The method of claim 1, wherein said content comprises a second link to download said third program, and wherein the method further comprises:
receiving, from said recipient, a request to download said third program, said request having been obtained by said recipient's activating said second link, which is surrounded by said first tag and said second tag; and
providing said third program to said recipient.

4. The method of claim 1, wherein the method further comprises:
offering a sender of said e-mail message an opportunity to send a plurality of photos,
and wherein said creating comprises:
including, in said e-mail message, a plurality of links to said photos, said first link being one of said plurality of links, each of said plurality of links being separately activatable by said recipient, and activation of each of said plurality of links causing invocation of said second program, when said e-mail message is viewed using said first program.

5. The method of claim 1, wherein said first link points to a map, wherein said first program displays said first link or text associated with said first link, and wherein said third program, when encountering said first link, retrieves said map and displays said map with said e-mail message.

6. The method of claim 1, wherein said first link points to contact information associated with a sender of said e-mail message, wherein said first program displays said first link or text associated with said first link, and wherein said third program, when encountering said first link, retrieves said contact information and displays, with said e-mail message, said contact information including at least some information that is not embedded in said e-mail message.

7. The method of claim 1, wherein said creating of said e-mail message is performed by an instance of said third program.

8. One or more computer-readable storage devices that store executable instructions that, when executed by a computer, implement a first messaging program that performs acts comprising:
recognizing a first tag and a second tag in a message received by said first messaging program as a signal for said first messaging program to analyze said message for links, to collect said links in said e-mail message, and to display, to a recipient, a dialog box that offers said recipient a chance to download images pointed to by the links in once action without the user having to activate the links separately, said first tag and said second tag not being recognizable by a second messaging program that is separate from said executable instructions, there being content in said message surrounded by said first tag and said second tag, said content including information that advises said recipient of an enhanced experience of viewing said message that is available with said first messaging program;
rendering, as part of a user interface, content contained in said message;
based on recognizing said first tag and said second tag in said message, omitting, from said user interface, said content surrounded by said first tag and said second tag; and
also based on recognizing said first tag and said second tag in said message, rendering said message to said recipient of said message by using at least one capability that is provided by said first messaging program but not by said second messaging program, actions that are performed by using said at least one capability comprising:
analyzing said message for links;
collecting said links in said message; and displaying, to said recipient, a dialog box that offers said recipient a chance to download images pointed to by the links in one action without the user having to activate the links separately.

9. The one or more computer-readable storage devices of claim 8, wherein said message comprises a plurality of images at a first resolution and a plurality of links to said images at one or more second resolutions, and wherein said at least one capability further comprises:
identifying said links to said images at said one or more second resolutions.

10. The one or more computer-readable storage devices of claim 8, wherein said links are links to images, each of said links being separately activatable by said recipient, and wherein said at least one capability further comprises:
receiving said recipient's request to download said images; and
downloading all of said images to said recipient without said recipient's separately activating said links.

11. The one or more computer-readable storage devices of claim 8, wherein said message comprises a link to a first map, and wherein said at least one capability comprises:
retrieving said first map from said link; and
including said first map in said user interface to be displayed to said recipient.

12. The one or more computer-readable storage devices of claim 8, wherein said message comprises contact information of a sender of said message, or a link to said contact information, and wherein said at least one capability comprises:
recognizing said contact information or said link to said contact information;
based on said recognizing of said contact information or of said link to said contact information, retrieving, from a site operated by a provider of said first messaging program, an item of contact information that is not embedded within said message; and
including said item of contact information in said user interface to be displayed to said recipient.

13. The one or more computer-readable storage devices of claim 8, wherein said message is generated by a service that is operated by an first entity that distributes or manufacturers said first messaging program, or by a second entity that has agreed with said first entity on a tag that is to be used to surround said material in said message.

14. The one or more computer-readable storage devices of claim 8, wherein said content comprises:
advice that an experience relating to said message could be enhanced by using said first messaging program, and
a link to download said first messaging program.

15. A system comprising:
a processor,
a data remembrance component,
an message-experience component that is stored in said data remembrance component and that executes on said processor, said system receiving, through a network, a message that comprises content surrounded by a first tag and a second tag and a plurality of links that can be activated by a user, said message-experience component recognizing said first tag and said second tag and, based on having recognized said first tag and said second tag, rendering a user interface that comprises said message without the content surrounded by said first tag and said second tag, and said message-experience component, also based on having recognized said first tag and said second tag,
analyzes said message for said links;
collects said links in said message;
displays, to said recipient, a dialog box that offers said recipient a chance to download images pointed to by the links;
receives, from said user, an indication that said user wants to download said images in one action without said user's having to activate the links separately; and
in response to receiving said indication, downloads the images pointed to by the links; said message-experience component being part of a first e-mail program that is different from a second e-mail program in that said second e-mail program does not have an ability to recognize said first tag and said second tag.

16. The system of claim 15, wherein said first tag and said second tag are not recognizable by a messaging program that is not said message-experience component or that does not include said message-experience component, wherein said messaging program displays said content when rendering said message.

17. The system of claim 15, wherein said message-experience component has a capability that a messaging program that is not said message-experience component, or that does not comprise said message-experience component, does not have, said message comprising a plurality of images at a first resolution, said plurality of links being to said images at one or more second resolutions, and wherein the capability is to identify said plurality of links to said images at said one or more second resolutions.

18. The system of claim 15, wherein said message-experience component has a capability that a messaging program that is not said message-experience component, or that does not comprise said message-experience component, does not have, said message comprising a link to a first map, and wherein said capability is (a) to retrieve said first map from said link, and (b) to include said first map in said user interface to be displayed to said user.

19. The system of claim 15, wherein said message-experience component has a capability that a messaging program that is not said message-experience component, or that does not comprise said message-experience component, does not have, said message comprising contact information of a sender of said message, or a link to said
contact information, and wherein said capability is (a) to recognize said contact information or said link to said contact information and to retrieve, from a site operated by a provider of said message-experience component, an item of contact information that is not included within said message and (b) to include said item of contact information in said user interface.

20. The system of claim 15, wherein said content comprises:
advice that an experience of viewing said message could be enhanced by using said message-experience component, and
a link to download said message-experience component.

* * * * *